United States Patent
Cline et al.

(10) Patent No.: US 7,606,115 B1
(45) Date of Patent: Oct. 20, 2009

(54) ACOUSTIC AIRSPACE COLLISION DETECTION SYSTEM

(75) Inventors: Duane M. Cline, Cypress, CA (US); Thomas T. Milkie, Cypress, CA (US)

(73) Assignee: Scientific Applications & Research Associates, Inc., Cypress, CA (US)

(*) Notice: Subject to any disclaimer, the term of this patent is extended or adjusted under 35 U.S.C. 154(b) by 234 days.

(21) Appl. No.: 11/974,840

(22) Filed: Oct. 16, 2007

(51) Int. Cl.
*G01C 23/00* (2006.01)

(52) U.S. Cl. .................... 367/124; 367/136; 367/909

(58) Field of Classification Search ................ 367/124, 367/136, 909; 244/194; 340/901; 701/3, 701/301
See application file for complete search history.

(56) References Cited

U.S. PATENT DOCUMENTS

| | | | | |
|---|---|---|---|---|
| 2,066,156 A | * | 12/1936 | Muffly | 367/909 |
| 2,382,557 A | * | 8/1945 | Frazier | 367/909 |
| 2,837,738 A | * | 6/1958 | Van Valkenburgh | 367/909 |
| 6,268,804 B1 | * | 7/2001 | Janky et al. | 367/909 |

* cited by examiner

*Primary Examiner*—Dan Pihulic
(74) *Attorney, Agent, or Firm*—Stetina Brunda Garred & Brucker

(57) ABSTRACT

An acoustic collision detection system that enables an aircraft to detect an approaching target, recognize the potential for collision and change course to maintain a safe separation distance, with or without operator invention. The acoustic collision detection system consists of an array of acoustic probes and a digital signal processor which receives acoustic data from the approaching target. The digital signal processor is configured to receive acoustic data from the array of acoustic probes; filter out noise and its own acoustic signals; extract the acoustic signals emanating from the approaching target; calculate the intensity, the bearing and the bearing angle rate of change of the approaching target, and determine whether the aircraft and the approaching target are on a potential collision course.

11 Claims, 3 Drawing Sheets

ACOUSTIC AIRSPACE COLLISION DETECTION SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates in general to an acoustic airspace collision detection system, and more particularly, to an acoustic airspace collision detection system for both piloted and unmanned aircraft that utilizes the sound generated by an approaching target to detect the direction of the target, assess the risk of collision, and automatically execute an evasive maneuver command.

Unmanned aerial vehicles (UAVs) are remotely piloted or self-piloted aircraft that can carry payloads, such as cameras, sensors, and communications equipment. UAVs perform a wide variety of intelligence, reconnaissance and surveillance missions on both the modern battlefield and in an increasing array of civilian applications. UAVs are appropriate for either hazardous missions that subject a pilot to an extreme risk of danger or extended missions that exceed or surpass the natural human endurance. Smaller UAVs offer the most operational flexibility in rapid response situations and geographic locations that lack the facilities to launch and recover aircraft.

The future of the UAV industry may be expanded to include a broader utilization in many different applications such as homeland security, law enforcement, agricultural and other civilian applications. Unfortunately such growth is hampered by certain obstacles.

For example, the utilization of UAVs in the National Airspace System (NAS) is limited to operation within predetermined flight corridors and restricted access zones. Future civilian applications of UAVs are impeded by these restrictions. These restrictions must remain in place unless there is a guarantee that UAVs can be flown with the equivalent level of safety of manned aircraft. Moreover, unmanned aircrafts must have the ability to detect and track traffic to a level equal to, or better than, the level required by the FAA order 7610.4 K "Special Military Operations" and FAR Part 91 to minimize the risk of midair collisions or other airspace incidents. Specifically, any UAV that operates in the NAS must possess an equivalent level of safety comparable to the see-and-avoid requirements for manned aircraft.

Restrictions are also placed on the use of military UAVs which are limited primarily to restricted military operational or test areas to avoid potential conflict with conventionally piloted aircraft. Similar to the operation of UAVs in civilian applications, these restrictions are necessary to avoid potential conflict with other aircraft in the geographic area. However, such restrictions may limit the effectiveness of a military mission because the UAV is prohibited from repositioning itself anywhere outside of the predetermined zones despite changing mission needs. In addition, the repeated use of limited flight corridors enables an enemy to anticipate flight paths and strategically place anti-aircraft weapons which compromises the survivability of a military UAV.

There are several different types of UAVs which are divided by class category according to size, range or flight endurance. Class I UAVs are close range vehicles having an operational range of approximately fifty kilometers. Class II UAVs have a flight duration of eight to ten hours and an operational range of two-hundred kilometers. Class III UAVs are endurance vehicles having a minimum of twenty four hours of coverage and the capability to perform multiple missions simultaneously. Prior art versions of collision detection systems, including optical and radar, have been tested on some Class III and Class IV UAVs. However, the implementation of such prior art systems has not been readily successful on smaller UAVs, such as Class I and Class II UAVs, because of the power requirements, weight, and costs of the systems.

The future growth of UAV utilization requires a UAV to be capable of detecting and avoiding all air traffic within its path of travel. The capability must interact, but not interfere, with other flight safety mechanisms of the UAV, as well as those of the approaching aircraft. Therefore, a collision detection system is needed that enables a UAV to detect any approaching aircraft in a geographic proximity, recognize the potential for a collision and initiate automatic evasive action to maintain a safe separation distance between itself and the "target" aircraft, with or without operator intervention.

BRIEF SUMMARY

An acoustic collision detection system is disclosed that comprises a digital signal processor in communication with an acoustic probe array that is mounted on exterior of an aircraft. The digital signal processor receives acoustic signals from an approaching target from the acoustic probe array and processes this data to remove noise and further assess whether the target poses a threat of collision. The digital signal processor is in communication with a flight management system of the aircraft to automatically generate and execute a clearance maneuver command based on the direction bearing of approaching air traffic, with or without operator intervention. The digital signal processor may further alert the aircraft operator of the collision danger.

The disclosed acoustic airspace collision detection system is economical and compact and provides in-flight target detection ranges of up to eight kilometers. The technology consists of an acoustic probe array and a digital signal processor which receives detected target acoustic data received by the acoustic probe array. The acoustic probe array utilizes windscreens and shock absorbers to remove the effects of wind noise and platform vibration. The system weighs approximately two hundred fifty grams and consumes approximately seven watts of six volt DC power. The acoustic collision detection system can be incorporated into a Class I, II or III UAV, in addition to manned aircraft.

The acoustic collision detection system is not limited to operation within predetermined flight corridors and restricted access zones because it can accurately detect a target within a spherical instantaneous coverage volume. Targets approaching from any angle can be easily detected, in contrast with narrow field-of-view sensors, such as optically-based collision detection systems, which must limit their operation to frontal sectors. Further, the acoustic probe assembly may detect sound sources at any time of day or night and in all weather conditions, including clouds or fog. The acoustic collision detection system may also detect impulsive events such as hostile gunfire so as to alert the operation to reposition the aircraft to a safe area or take other evasive action.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are intended to be encompassed within the scope of the invention.

Figure 1:
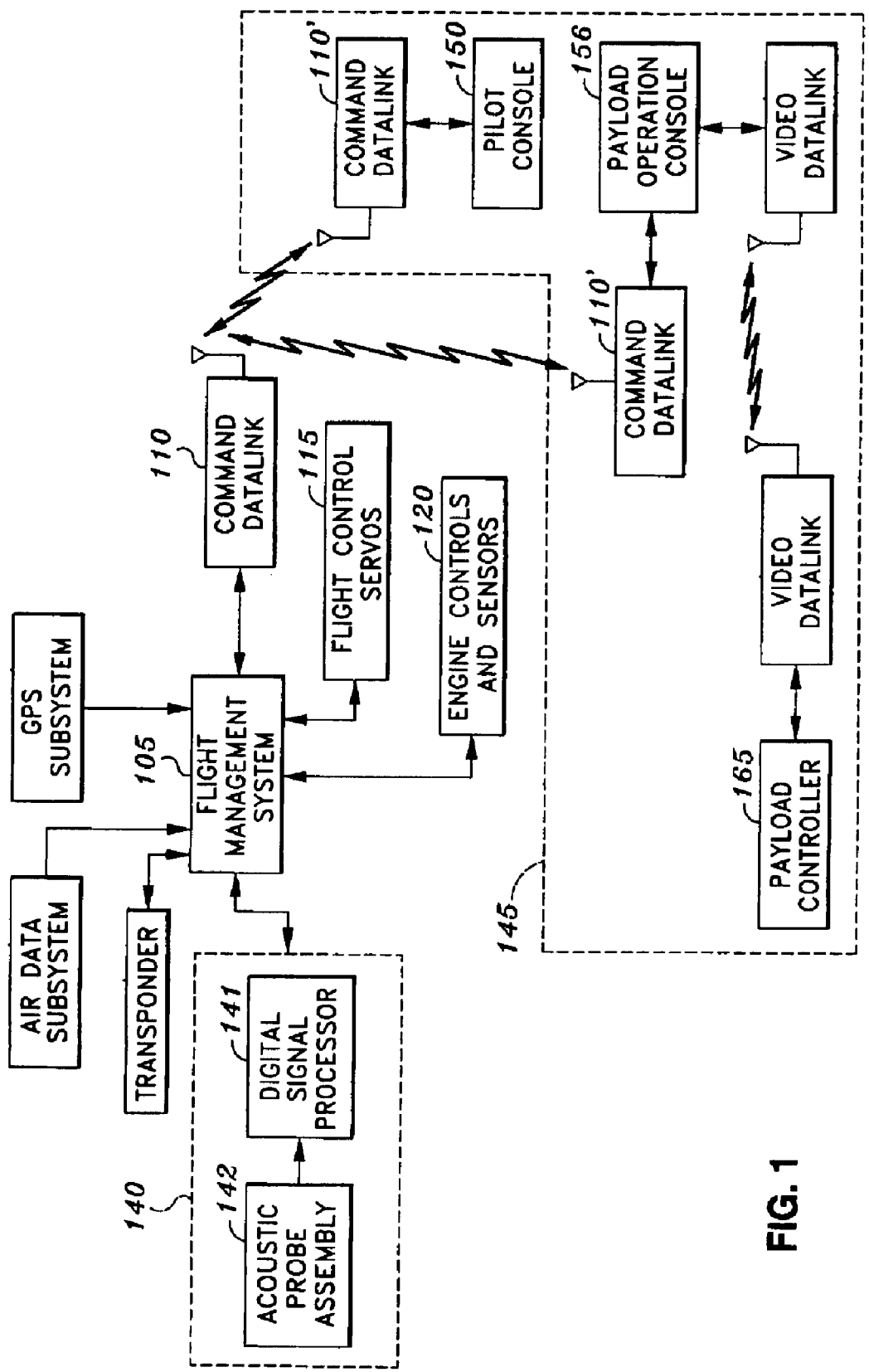
FIG. 1 is a block diagram of an exemplary system that may be used to operate an acoustic collision detection system integrated into an aircraft according to an aspect of the present invention.

FIG. 1 is a block diagram of an exemplary integrated architecture that incorporates an acoustic collision detection system 140 into the architecture of an aircraft which is further in communication with a ground control center 145. Although FIG. 1 is directed to the incorporation of the acoustic collision detection system into a UAV, the system may be adapted for use in any type of aircraft, whether piloted or unmanned. A ground control center 145 is comprised of two consoles including a pilot console 150 and a payload operator console 156. Typically, a pilot operates the aircraft through the pilot console 150 and a payload operator controls an on-board payload, such as a video device, through the payload operator console 156. A command datalink 110, 110' is provided between the aircraft and the ground control center 145 which enables the pilot to receive vehicle status and navigation data from the aircraft and send commands to the flight management system 105. A payload operator console 156 is a device that may be located remote from pilot console 150 that enables real-time reception of payload data.

The flight management system 105 is in electronic communication with flight control servos 115 which are devices that receives electrical commands from flight management system 105. The flight control servos 115 translate the electrical commands into actual proportional displacement of flight surfaces, such as ailerons, elevator, and rudder. It can be appreciated by one skilled in the art that an aircraft may have more than one flight control servo 115 in communication with the flight management system 105 with each flight control servo 115 controlling a different flight surface. The flight management system 105 may also be in electronic communication with engine controls and sensors 120 which may include controls and sensors to detect conditions including, but not limited to, engine temperature, engine RPM, and battery voltage.

Figure 2:
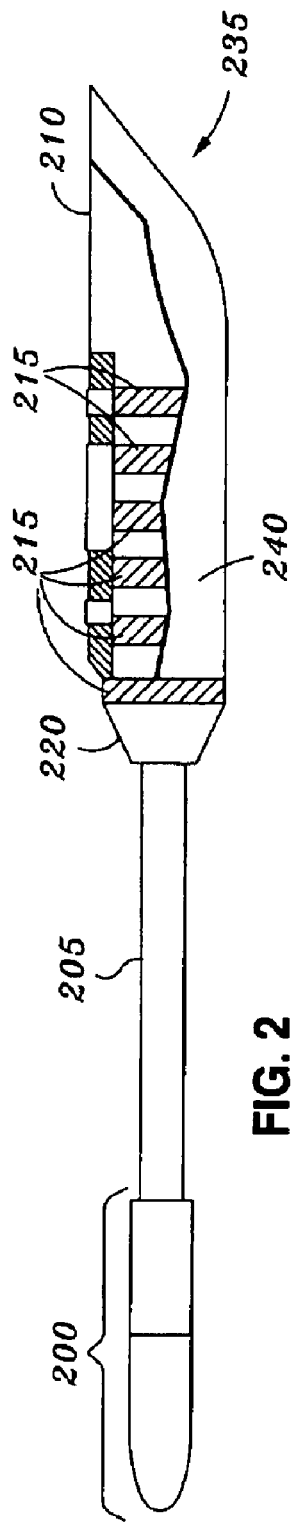
FIG. 2 is a partial cutaway of an exemplary embodiment of an acoustic probe.
Figure 3B:
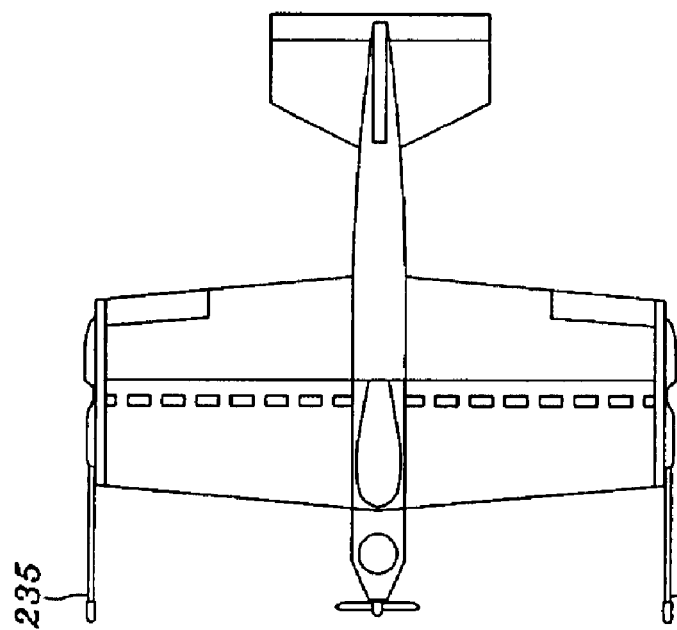
FIGS. 3A and 3B show an exemplary representation of the integration of an acoustic probe array on the exterior of an aircraft, in accordance with one aspect of the present invention.
Figure 3A:
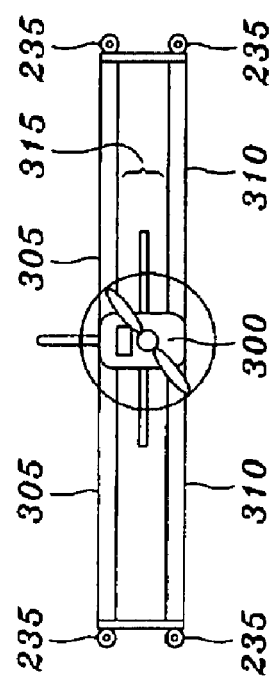

The aircraft also includes an acoustic collision detection system 140 comprising a digital signal processor 141 in communication with an acoustic probe array 142 that is mounted on the exterior of the aircraft, as further described with respect to FIGS. 2, 3A and 3B. The digital signal processor 141 is a six channel digital signal processor that receives acoustic data of an approaching target from the acoustic probe array 142. The digital signal processor 141 further comprises at least a processor (not shown), a built-in storage memory (not shown) and a power source (not shown).

FIG. 2 shows an exemplary embodiment of an acoustic probe 235. The acoustic probe 235 includes at least one acoustic sensor 200 capable of detecting target acoustic data from any direction. A rod 205 is coupled at one end to the acoustic sensor 200 and a portion of an opposite end of the rod 205 extends into a fairing 220 which is further partially covered by a housing 240. The portion of fairing 220 covered by the housing 240 is provided with several evenly spaced shock absorbers 215 which isolate the acoustic sensor 200 from noise produced by external mechanical vibrations of the acoustic probe 235. The fairing 220 has a streamlined shape on its exposed portion to prevent turbulent airflow, generally, across the acoustic probe 205, and thereby reduces the acoustic noise created by any such turbulence. The housing 240 may be customized depending on the platform type of the aircraft to which it is affixed. A microphone wire 210 extends from end of the housing 240 opposite the acoustic sensor 200.

The acoustic collision detection system may be integrated into almost any type of aircraft, whether manned or unmanned. FIGS. 3A and 3B show an exemplary placement of several acoustic probes 235 on an aircraft. The aircraft has a body 300 and an upper wing pair 305 and a lower wing pair 310, the upper wing pair 305 and the lower wing pair 310 parallel to each other and separated by a gap 315. An acoustic probe 235 is mounted at the end of each wing using conventional mounting hardware. An example of a suitable aircraft for this particular placement is the BUSTER UAV, which is a portable mini-UAV built by Mission Technologies, Inc. of San Antonio, Tex. It should be appreciated by one skilled in the art that two or more acoustic probes 235 may be used with the disclosed acoustic collision detection system. FIG. 3B shows that the wires 210 of the acoustic probe array can be routed through the wings.

Figure 4:
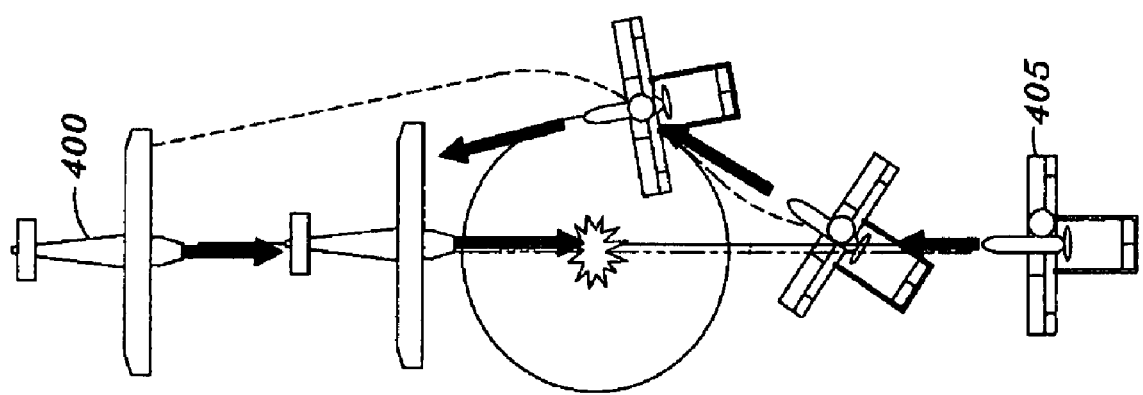
FIG. 4 illustrates a frontal approach scenario of an aircraft equipped with the acoustic collision detection system and a target, according to an aspect of the present invention.

FIG. 4 illustrates the operation of the acoustic collision detection system. The acoustic sensors of the acoustic probe assembly continuously collect acoustic data. A target 400 is detected at an initial detection point on an original flight path of an aircraft 405. If the intensity of the acoustic data of target 400 is increasing and the bearing angle rate of change is at or near zero, the digital signal processor identifies the target 400 as being on a collision course with the aircraft 405.

The direction to the target, which is measured in the horizontal plane as the azimuth bearing angle and in the vertical plane as the elevation angle, is calculated based on the filtered acoustic signal emanating from the target. Specifically, the direction of the target aircraft can be determined through the calculation of the relative phase difference of sound received acoustic probes separated in the lateral or vertical directions. The phase is computed by means of the Fourier Transform of a time series collection of sound data. The target direction may also be determined by measuring the bearing of the maximum signal level using a beam-forming algorithm that computes or searches among direction angles for the best solution for the signal pattern arriving at the acoustic probe array.

It is well known in the art that as two vehicles approach one another on a collision course the bearing angle rate of change between the two vehicles decreases to zero, while the bearing angle rate of change of two vehicles that are not approaching each other increases rapidly. The determination as to whether an aircraft and a target may collide can be determined by assessing certain criteria, including whether the sound from the target is increasing, whether the bearing angle rate of change is sufficiently small, or by a combination of these criteria through application of the bearing rate information in both the horizontal and vertical planes. Bearing calculation error may result when the aircraft and the target are approaching each other at speeds that are a significant fraction of the speed of sound. Further, the relative wind effects may induce some error in bearing calculation. However, the bearing determination and the bearing angle rate of change can be computed over a smoothed time interval to a sufficient level of accuracy. Thus, it is not necessary to be extremely accurate in applying these criteria as it is expected that in most applications the nearby presence of a target would be sufficient to prompt an avoidance reaction by the aircraft, as such conditions would expect to be rare, and the cost of performing such a pre-emptive move to be relatively minor.

The digital signal processor analyzes the indicated criteria to assess whether the aircraft is on a collision course with an approaching target aircraft. If any of the above criteria pass a threshold level, the digital signal processor sends a signal to the flight management system of the aircraft to initiate an avoidance maneuver. Alternatively, the digital signal processor may directly send commands to the flight control servos of the aircraft, which may override or disable any commands generated by the flight control system of the aircraft. Alternatively, or in addition to the above automatic response, the digital signal processor can send status information to the operator of the aircraft through the command data link to alert the operator for possible action. Alternatively, the digital signal processor can also apply a modified flight plan through the operator's ground control unit, such as by adding a new flight waypoint that causes the aircraft to change course suddenly. This accomplishes an automated avoidance maneuver for the aircraft without the need for modification of the aircraft's flight control system, and may be preferred so as to allow ease of integration into an aircraft's existing system.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An acoustic collision detection system for avoiding a potential collision between an aircraft and an approaching target comprising:

an array of acoustic probes;

a digital signal processor configured to receive acoustic data from the array of acoustic probes, wherein said digital signal processor filters out noise and its own acoustic signals; extracts the acoustic signals emanating from the approaching target; calculates the intensity, the bearing and the bearing angle rate of change of the approaching target, and determines whether the aircraft and the approaching target are on a potential collision course.

2. The acoustic collision detection system of claim 1, wherein the aircraft is an unmanned aerial vehicle.

3. The acoustic collision detection system of claim 1, wherein the array of acoustic probes is mounted to the exterior of the aircraft.

4. The acoustic collision detection system of claim 1, wherein an acoustic probe further comprises at least one shock absorber.

5. The acoustic collision detection system of claim 1, wherein the digital signal processor is interfaced with at least one flight management system and the flight control servos of the aircraft.

6. The acoustic collision detection system of claim 5, wherein said flight management system is in communication with a flight control servos and wherein said flight management system receives an evasive maneuver command and sends the command to said flight control servos to displace an appropriate flight surface.

7. The acoustic collision detection system of claim 5, wherein said digital signal processor sends an evasive maneuver command to the flight control servos to displace an appropriate flight surface.

8. The acoustic collision detection system of claim 1, wherein the digital signal processor is in communication with a ground control center through a command datalink.

9. The acoustic collision detection system of claim 8, wherein the digital signal processor can apply a modified flight plan through the ground control center by adding a new flight waypoint.

10. The acoustic collision detection system of claim 8, wherein an evasive maneuver command can be sent to the flight control servos from the ground control center.

11. The acoustic collision detection system of claim 1, wherein the bearing and the bearing angle rate of change are calculated over a smoothed time interval.

* * * * *